United States Patent
Raghava et al.

(10) Patent No.: US 10,649,927 B2
(45) Date of Patent: May 12, 2020

(54) DUAL IN-LINE MEMORY MODULE (DIMM) PROGRAMMABLE ACCELERATOR CARD

(71) Applicant: Intel Corporation, Santa Clara, CA (US)

(72) Inventors: Sharath Raghava, Los Gatos, CA (US); Dheeraj Subbareddy, Portland, OR (US); Kavitha Prasad, San Jose, CA (US); Ankireddy Nalamalpu, Portland, OR (US); Harsha Gupta, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/211,868

(22) Filed: Dec. 6, 2018

(65) Prior Publication Data

US 2019/0108145 A1 Apr. 11, 2019

Related U.S. Application Data

(60) Provisional application No. 62/719,911, filed on Aug. 20, 2018.

(51) Int. Cl.
| | |
|---|---|
| *G06F 13/38* | (2006.01) |
| *G06F 13/16* | (2006.01) |
| *G06F 13/12* | (2006.01) |
| *G06F 13/42* | (2006.01) |

(52) U.S. Cl.
CPC ........ *G06F 13/1668* (2013.01); *G06F 13/124* (2013.01); *G06F 13/4243* (2013.01); *G06F 13/4282* (2013.01)

(58) Field of Classification Search
CPC ....................................................... G06F 9/00
See application file for complete search history.

(56) References Cited

U.S. PATENT DOCUMENTS

| | | | |
|---|---|---|---|
| 8,429,436 B2 | 4/2013 | Fillingim et al. | |
| 9,250,954 B2 * | 2/2016 | Dalal | G06F 13/16 |
| 9,619,396 B2 * | 4/2017 | Blankenship | G06F 12/0891 |
| 9,870,333 B1 | 1/2018 | Lam et al. | |
| 9,887,008 B2 * | 2/2018 | Lee | G06F 13/382 |
| 2005/0278680 A1 | 12/2005 | Mukherjee et al. | |

(Continued)

FOREIGN PATENT DOCUMENTS

CN 106970894 7/2017

*Primary Examiner* — Cheng Yuan Tseng
(74) *Attorney, Agent, or Firm* — Treyz Law Group, P.C.; Jason Tsai

(57) ABSTRACT

A central processing unit (CPU) may be directly coupled to an accelerator dual in-line memory module (DIMM) card that is plugged into a DIMM slot. The CPU may include a master memory controller that sends requests or offloads tasks to the accelerator DIMM card via a low-latency double data rate (DDR) interface. The acceleration DIMM card may include a slave memory controller for translating the received requests, a decoder for decoding the translated requests, control circuitry for orchestrating the data flow within the DIMM card, hardware acceleration resources that can be dynamically programmed to support a wide variety of custom functions, and input-output components for interfacing with various types of non-volatile and/or volatile memory and for connecting with other types of storage and processing devices.

15 Claims, 7 Drawing Sheets

(56) References Cited

U.S. PATENT DOCUMENTS

2010/0036997 A1 2/2010 Brewer et al.
2012/0047126 A1 2/2012 Branscorne et al.
2018/0024739 A1 1/2018 Schmisseur

* cited by examiner

DUAL IN-LINE MEMORY MODULE (DIMM) PROGRAMMABLE ACCELERATOR CARD

This application claims the benefit of provisional patent application No. 62/719,911, filed Aug. 20, 2018, which is hereby incorporated by reference herein in its entirety.

BACKGROUND

This relates to integrated circuits and, more particularly, to programmable integrated circuits in a hardware acceleration platform.

Programmable integrated circuits are a type of integrated circuit that can be programmed by a user to implement a desired custom logic function. In a typical scenario, a logic designer uses computer-aided design tools to design a custom logic circuit. When the design process is complete, the computer-aided design tools generate configuration data. The configuration data is loaded into memory elements on a programmable integrated circuit to configure the device to perform the functions of the custom logic circuit.

Programmable devices may be used for co-processing in big-data, fast-data, or high performance compute (HPC) applications. For example, programmable devices may be used in application acceleration tasks in a data center and may be reprogrammed during data center operation to perform different tasks. By offloading computationally intensive tasks from a host processor to highly-parallel acceleration resources on a programmable device (sometimes referred to as a co-processor or an acceleration processor), the host processor is freed up to perform other critical processing tasks. The use of programmable devices as hardware accelerators can therefore help deliver improved speeds, latency, power efficiency, and flexibility for end-to-end cloud computing, networking, storage, artificial intelligence, autonomous driving, virtual reality, augmented reality, gaming, and other data-centric applications.

It is within this context that the embodiments described herein arise.

DETAILED DESCRIPTION

The present embodiments relate to a system where a host processor (e.g., a central processing unit or CPU) is coupled to a programmable acceleration device formed on a dual in-line memory module (DIMM) card. The DIMM card may also include various types of memory devices not limited to dynamic random-access memory (DRAM) that are coupled to and accessed by the programmable acceleration device.

The host processor has a master memory controller that communicates with the DIMM card via a low latency path. Since the communications path between the host processor and the DIMM card is latency sensitive, the DIMM card may have a slave memory controller that interfaces with the master memory controller on the CPU using a double data rate (DDR) protocol such as the Transactional DDR (DDR-T) protocol or any non-volatile memory protocol. In this example, compute operations that need to be performed on the memory in the DIMM card are encoded and sent to the programmable acceleration device as DDR-T transactions. Since the memory on the DIMM card is accessed using the programmable acceleration device, any memory interface can be implemented using programmable input-output (IO) components on the programmable device while keeping the CPU's interface as DDR-T.

Offloading computationally intensive functions onto the accelerator DIMM card is oftentimes more efficient than performing them natively on the host CPU due to the highly parallel nature of the programmable device. The algorithmic logic in the programmable acceleration device can be custom tailored to a specific application or data access patterns that the current workload uses. For example, minimum/maximum or other statistical operations on large amounts of sequential data is typically best performed using the programmable accelerator device without burdening the memory cache on host CPU itself.

It will be recognized by one skilled in the art, that the present exemplary embodiments may be practiced without some or all these specific details. In other instances, well-known operations have not been described in detail in order not to unnecessarily obscure the present embodiments.

Figure 1:
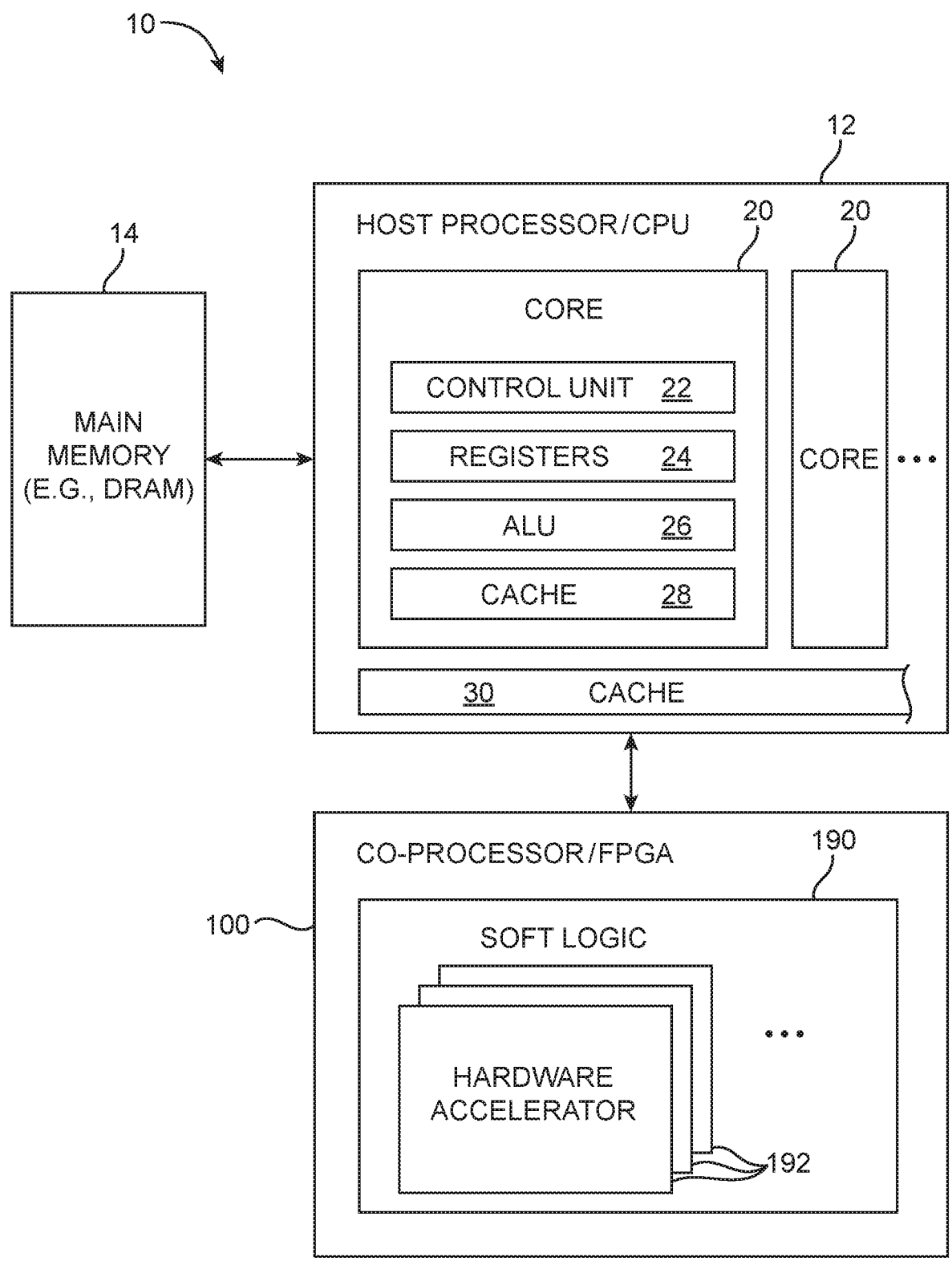
FIG. 1 is a diagram of an illustrative system having a host processor coupled to a programmable acceleration coprocessor in accordance with an embodiment.

FIG. 1 is a diagram of an illustrative system having a host processor coupled to a programmable acceleration coprocessor. As shown in FIG. 1, system 10 includes a host processor such as host processor 12, memory such as main memory 14 that is connected to host processor 12, and a coprocessor such as coprocessor 100 on which one or more computationally intensive tasks can be offloaded from host processor 12.

Host processor 12 may for example be a central processing unit (CPU), a microprocessor, a microcontroller, or a graphics processing unit (GPU) that is implemented as an application specific integrated circuit (ASIC) device or an application specific standard product (ASSP) device. Host processor 12 (sometimes referred to as a host CPU or simply CPU) may include one or more processing cores 20 for processing instructions of a computer program. Each processor core 20 may include a control unit 22, registers 24, an arithmetic logic unit (ALU) 26, and an associated memory cache 28.

Control unit 22 may be responsible for orchestrating the overall operation of core 20 and may include circuits for fetching instructions stored in program memory, decoding the fetched instructions, and then sending out the decoded instructions for execution. If needed, arithmetic logic unit 26 may be used to perform arithmetic and logical/Boolean operations on the data as specified in the instructions. The results of the executed operation may be stored back into memory. Registers 24 may provide high-speed special-purpose temporary storage for core 20. Registers 24 may include instruction registers for storing the instruction currently being executed, data registers for storing data waiting to be processed or data resulting from the current process, address registers, status registers, program state registers, etc.

Memory cache 28 is a smaller and faster memory that stores copies of data from recent or frequently used main memory locations, so subsequent requests from the processor can be served faster as opposed to retrieving the data from the main memory (i.e., a relatively time consuming process). In the example of FIG. 1, CPU 12 may also include cache 30 that sits below cache 28 in the overall hierarchy and can optionally be shared among two or more CPU cores 20.

Main memory 14 refers to physical memory that can be directly accessed by CPU 12. Main memory 14 is traditionally implemented using volatile memory components such as dynamic random-access memory (DRAM). Main memory (sometimes also referred to as primary storage) is distinguished from external mass storage devices such as disk drives, optical drives, and tape drives. CPU 12 can only manipulate data that is stored in main memory 14. Thus, every program that is executed or every file that is accessed must be copied from the external mass storage device into main memory 14. The amount of storage in memory main 14 determines how many programs can be executed at any point in time and the amount of data that can be made readily available to the program.

Coprocessor 100 may be a programmable integrated circuit device or a programmable logic device. Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. Configurations in which coprocessor 100 is implemented as an FPGA is described herein as an example.

Figure 2:
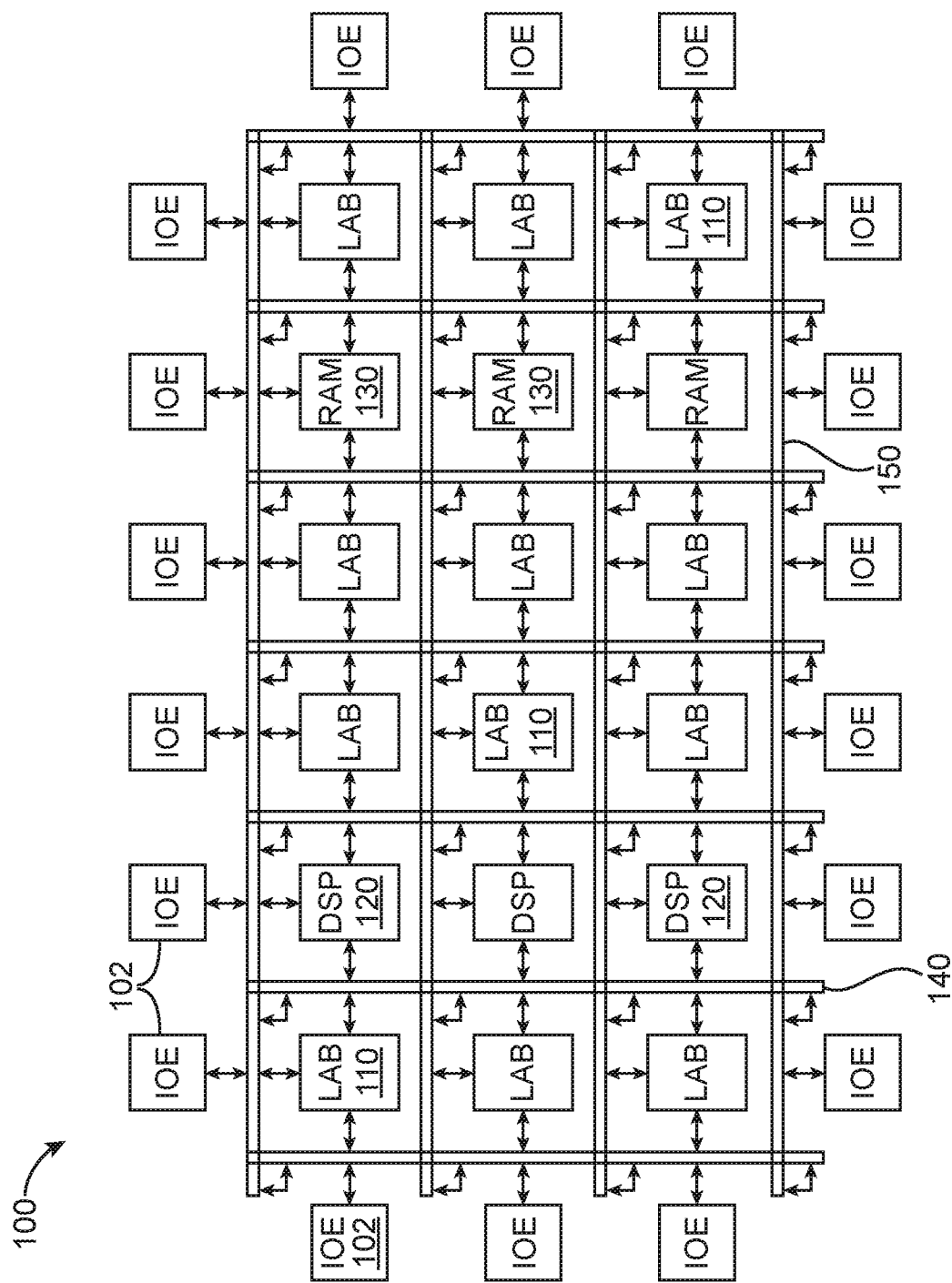
FIG. 2 is a diagram of an illustrative programmable integrated circuit in accordance with an embodiment.

FIG. 2 shows how device 100 (e.g., an FPGA die) may include a two-dimensional array of functional blocks, including logic array blocks (LABs) 110 and other functional blocks, such as random-access memory (RAM) blocks 130 and digital signal processing (DSP) blocks 120. Functional blocks such as LABs 110 may include smaller programmable regions (e.g., logic elements, configurable logic blocks, or adaptive logic modules) that receive input signals and perform custom functions on the input signals to produce output signals. LABs 110 may also be grouped into larger programmable regions sometimes referred to as logic sectors that are individually managed and configured by corresponding logic sector managers. The grouping of the programmable logic resources on device 100 into logic sectors, logic array blocks, logic elements, or adaptive logic modules is merely illustrative. In general, device 100 may include functional logic blocks of any suitable size and type, which may be organized in accordance with any suitable logic resource hierarchy.

Programmable logic device 100 may contain programmable memory elements. Memory elements may be loaded with configuration data (also called programming data or configuration bitstream) using input-output elements (IOEs) 102. Once loaded, the memory elements each provide a corresponding static control signal that controls the operation of an associated functional block (e.g., LABs 110, DSP 120, RAM 130, or input-output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration random-access memory (CRAM), or programmable memory elements. Programmable logic device (PLD) 100 may be configured to implement a custom circuit design. For example, the configuration RAM may be programmed such that LABs 110, DSP 120, and RAM 130, programmable interconnect circuitry (i.e., vertical channels 140 and horizontal channels 150), and the input-output elements 102 form the circuit design implementation.

In addition, the programmable logic device may have input-output elements (IOEs) 102 for driving signals off of device 100 and for receiving signals from other devices. Input-output elements 102 may include parallel input-output circuitry, serial data transceiver circuitry, differential receiver and transmitter circuitry, or other circuitry used to connect one integrated circuit to another integrated circuit.

Device 100 may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

In general, the combination of the programmable logic (e.g., LABs 110 and other configurable logic components) and the programmable routing circuitry (e.g., vertical routing channels 140 and horizontal routing channels 150) on device 100 may be referred to as "soft logic." Soft logic such as soft logic 190 on programmable device 100 may be configured to implement one or more hardware (HW) accelerators such as HW acceleration units 192 to help accelerate the performance of host processor 12. Configured as such, coprocessor 100 is sometimes be referred to as a hardware accelerator. As examples, HW acceleration units 192 on coprocessor 100 may be used to accelerate a variety of functions, which may include but are not limited to: encryption/decryption, compression/decompression, Fast Fourier transforms, video encoding/decoding, convolutional neural networks (CNN), firewalling, intrusion detection, database searching, domain name service (DNS), load balancing, caching network address translation (NAT), and other suitable network packet processing applications, just to name a few.

Figure 3:
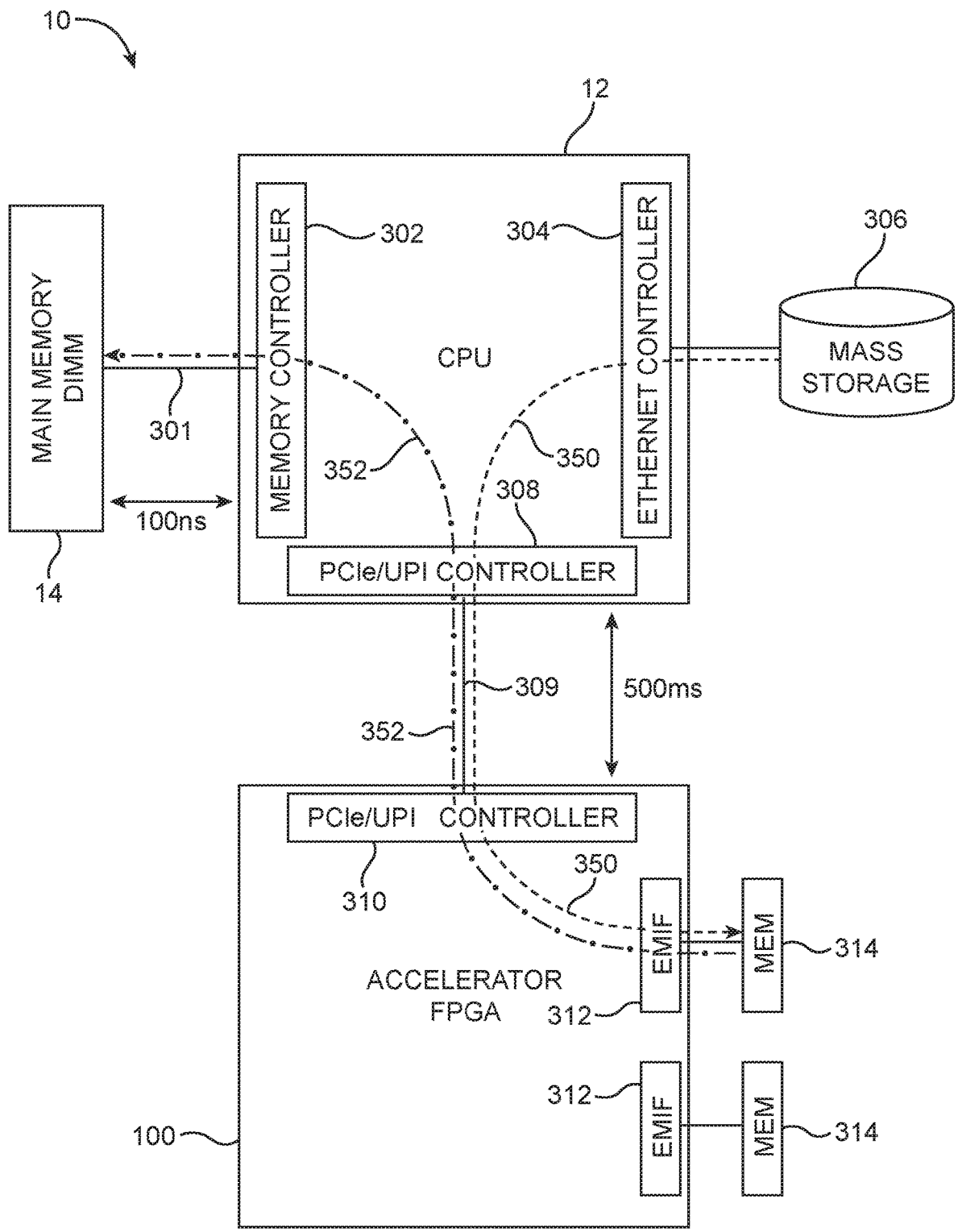
FIG. 3 is a diagram of a system in which the host processor is coupled to the programmable acceleration coprocessor via a high latency path.

FIG. 3 is a diagram of a system 10 that employs hardware acceleration resources. As shown in FIG. 3, host CPU 12 is coupled to a main memory dual in-line memory module (DIMM) component 14 via path 301. In particular, CPU 12 may include a memory controller 302 for interfacing with main memory DIMM 14 using double data rate (DDR) interfaces such as DDR type-3 (DDR3) or DDR type-4 (DDR4). Host CPU 12 is also coupled to an external mass storage device such as mass storage device 306. CPU 12 may include (for example) an Ethernet controller 304 for interfacing mass storage 306. In general, controller 304 might also support the Universal Serial Bus (USB) interface, Serial AT Attachment (SATA) interface, or other legacy computer bus interface standards.

CPU 12 may further be coupled to acceleration FPGA device 100 via path 309. FPGA device 100 may be configured to provide acceleration hardware resources for host CPU 12. CPU 12 may include (for example) a Peripheral Component Interconnect Express (PCIe) controller 308 or a coherent point-to-point interconnect controller such as the UltraPath Interconnect (UPI) controller 308 developed by INTEL Corporation. FPGA 100 may also include a corresponding controller 310 (e.g., a PCIe controller, a UPI controller, etc.) for interfacing with controller 308.

FPGA 100 may further include external input-output (IO) blocks such as external IC blocks 312. External IO blocks 312 may support wide parallel interfaces such as external memory interfaces (EMIF) or more generic interfaces like GPIO (general purpose input-output) or LVDS (low-voltage differential signaling) interfaces. External memory interfaces that are supported by blocks 312 may include double data rate (DDR) interfaces such as DDR type-3 (DDR3), low power DDR3 (LPDDR3), DDR type-4 (DDR4), low power DDR4 (LPDDR4), DDR type-5 (DDR5), graphics DDRx, quad data rate (QDR), Open NAND Flash Interface (ONFI), or other suitable interfaces for communicating with memory 314 that can be accessed by FPGA 100. Blocks 312 may therefore include memory controllers for supporting a wide variety of external memory protocols.

Computation in traditional von Neumann computer architectures typically involves bringing data and program code from memory into the CPU registers (e.g., registers 24 in FIG. 1) and then storing the results back into the memory. In the example of FIG. 3, consider a scenario in which CPU 12 needs to access encrypted data on mass storage device 306. In this situation, CPU 12 would need to retrieve the encrypted data from the desired location on mass storage 306 and route the retrieved data to accelerator FGPA 100 for decryption. The decrypted data is then stored on memory 314 (see flow of data as indicated by dotted path 350). In order for CPU 12 to access this data, the decrypted data will then have to be routed through CPU 12 and stored on main memory DIMM 14 (see flow of data as indicated by dotted path 352). At this point, CPU 12 can finally access the decrypted data via DDR interconnect 301.

The power and cost of marshalling data to and from memory in this way might be justified if the compute time being done natively on CPU 12 is relatively large. Many emerging applications such as data analytics, machine learning, in-memory databases, and unstructured databases, however, only involve relatively small compute operations and therefore do not conform to these energy tradeoffs.

As shown in the example of FIG. 3, a data transfer across the PCIe/UPI interface 309 might take hundreds of milliseconds, whereas a data transfer across the DDR interface 301 might only take hundreds of nanoseconds. Since the transfer speed of interface 301 is so much faster than that of interface 309, path 301 is sometimes referred to herein as a "low latency" path whereas path 309 is sometimes referred to herein as a "high latency" path. For example, if the high latency path 309 takes 500 ms and the low latency path takes 300 ns, high latency path 309 would be 1667 times slower (e.g., 500 m/300 n=5000) than low latency path 301 is merely illustrative. In general, the latency across high latency path 309 may be at least 10 times, at least 20 times, 20-100 times, 100-1000 times, 1000-5000 times, or more than 5000 times greater than the latency across low latency path 301.

In accordance with an embodiment, an improved system is provided where the acceleration circuitry is formed as part of the DIMM card to take advantage of the low latency path connecting the host CPU to the DIMM card. By expanding the traditional von Neumann architecture to enable small computations in the main memory path in addition to simply fetching data results in significant improvements in terms of energy spent per unit of computation.

Figure 4:
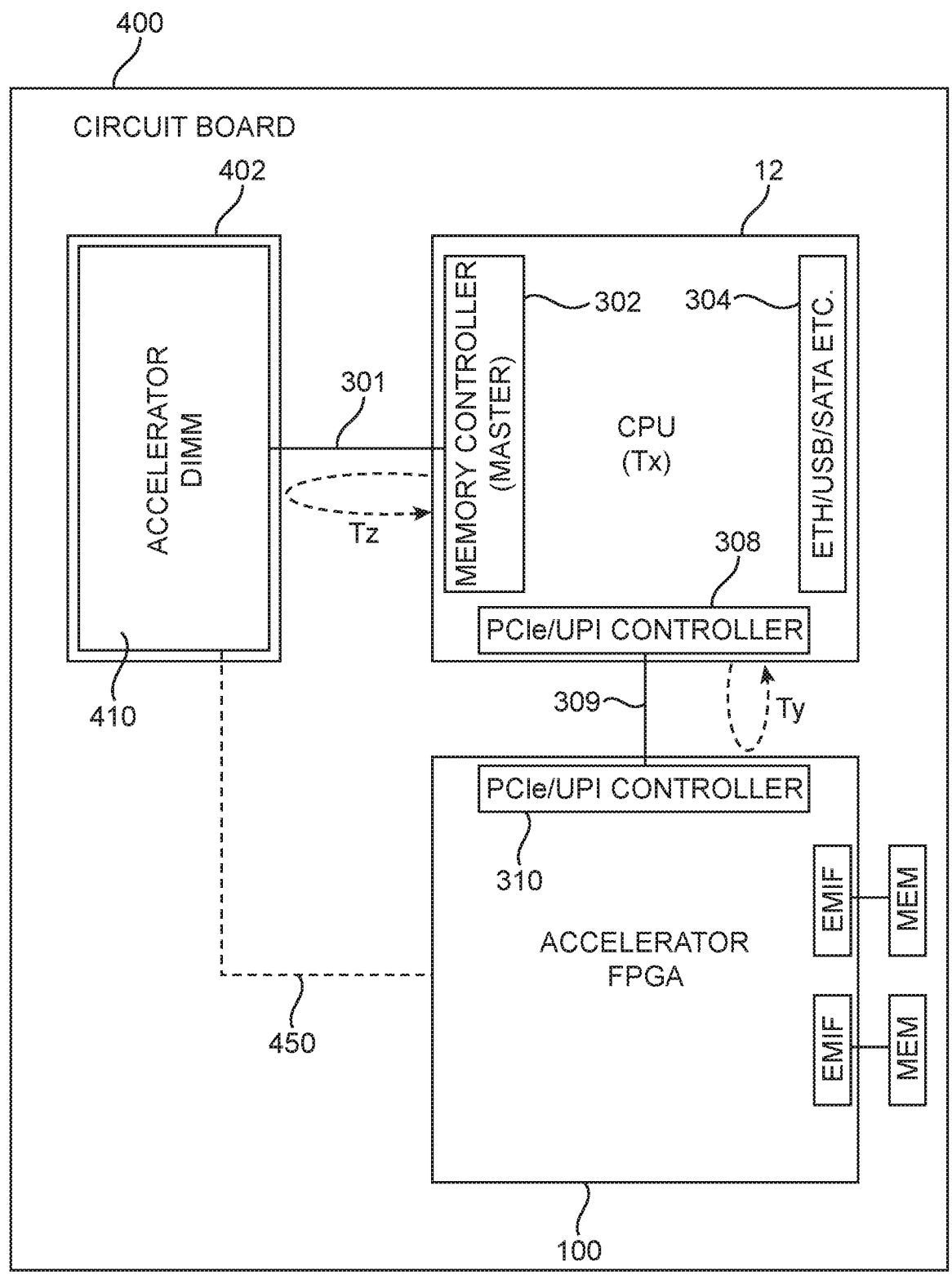
FIG. 4 is a diagram of an illustrative system in which the host processor is coupled to a programmable accelerator dual in-line memory module (DIMM) card in accordance with an embodiment.

FIG. 4 is a diagram of an illustrative system in which host CPU 12 is coupled to a programmable accelerator DIMM card 410. CPU 12 may still be coupled to acceleration coprocessor 100 via PCIe/UPI link 309, but additional programmable acceleration resources such as an FPGA die can be integrated within memory DIMM 410. CPU 12 may be installed within a CPU socket on circuit board 400 (e.g., a printed circuit board or a motherboard). Accelerator FPGA 100 may be installed within a PCIe slot or another CPU socket on circuit board 400. Accelerator DIMM 410 may be installed within a traditional memory DIMM slot 402 on circuit board 400. As implied by its name, accelerator DIMM card 410 may have the traditional DIMM form factor. Configured in this way, the motherboard design need not be changed.

Host CPU 12 uses on-chip memory controller 302 (sometimes referred to as the "master" memory controller) to communicate with accelerator DIMM card 410 using a transaction-based protocol such as the Transaction DDR (DDR-T) protocol, as an example. In contrast to typical DDRx protocols that expect results to be returned back to the CPU within a finite amount of time in a lock step fashion, the DDR-T protocol may be easier to implement as part of a programmable accelerator device and calls for less stringent return policies where transactions can be processed in a more open-ended fashion. This example in which the programmable accelerator device communicates with the CPU using the DDR-T protocol is merely illustrative. In general, the CPU may communicate with the programmable accelerator device using any non-volatile memory protocol (e.g., any NVDIMM protocol). From a high level, master memory controller 302 issues requests to accelerator DIMM 310 and waits for corresponding responses.

Figure 5:
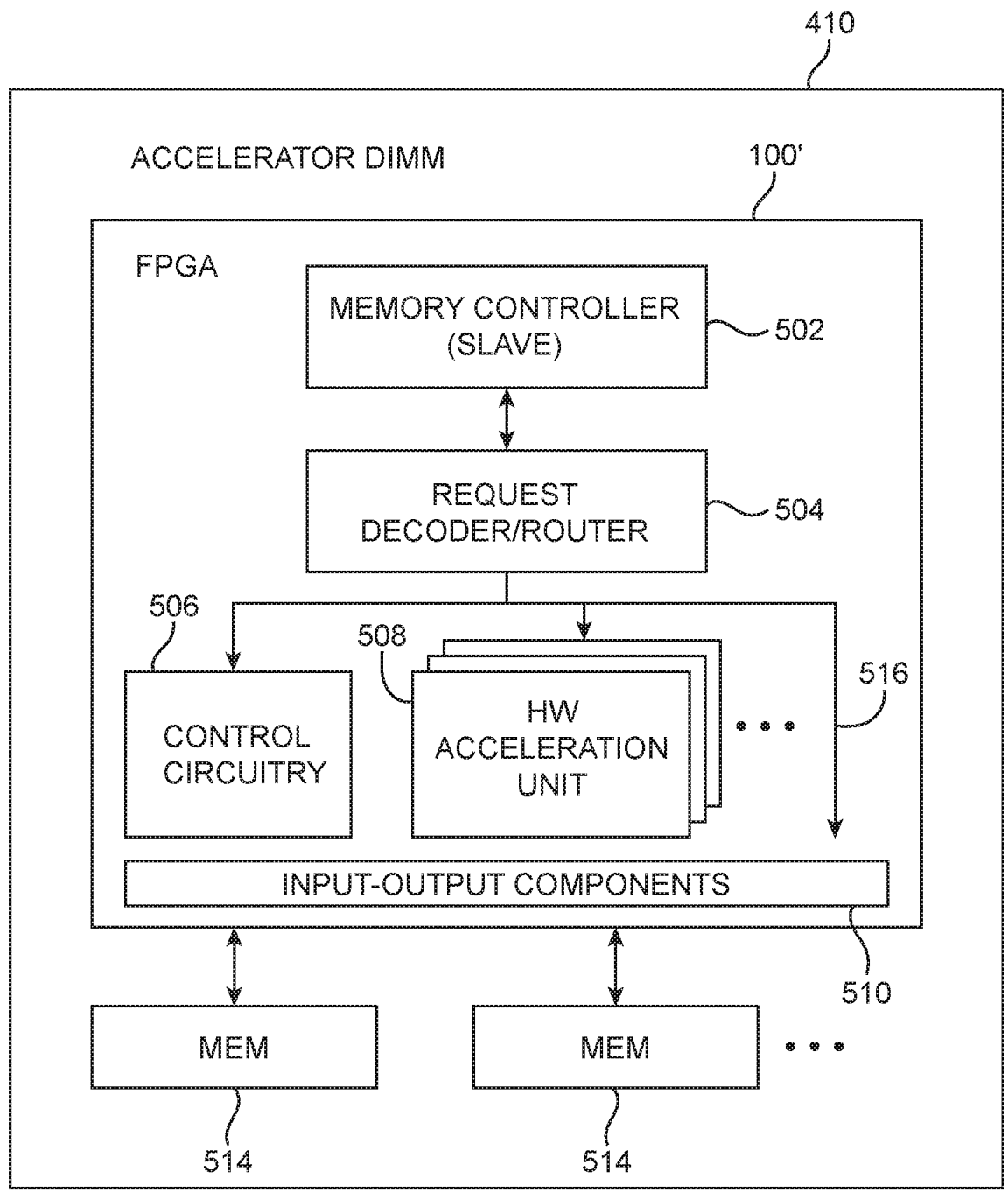
FIG. 5 is a diagram of an illustrative programmable accelerator DIMM card in accordance with an embodiment.

Details of accelerator DIMM card 410 are shown in FIG. 5. As shown in FIG. 5, accelerator DIMM 410 may include another programmable device 100' (e.g., an FPGA) coupled to multiple memory devices 514. Device 100' may be similar to the type of programmable integrated circuit shown and described in connection with FIG. 2. In particular, device 100' may also be provided with a memory controller 502, a request decoding/routing circuit such as request decoder/router 504, control circuitry 506, and one or more hardware acceleration units 508.

Memory controller 302 within device 100' responds to the requests received from the master memory controller on the host CPU and is therefore sometimes referred to herein as the "slave memory controller." Slave memory controller 502 may be configured to interpret the received request in accordance with a predetermined communications protocol (e.g., the DDR-T protocol) and to translate the requests to a format that decoder 504 can understand. For example, slave memory controller 502 (sometimes referred to as a DDR slave controller) may be used to translate signals into packets. This example in which DDR slave 502 supports the DDR-T protocol is merely illustrative. In general, slave memory controller 502 may be configured to support any transaction-based interface protocol, other DDR technologies like DDRx, LPDDRx, and GDDRx, QDR technologies, NVDIMM protocols, and/or other main memory IO standards.

Request decoder 504 (sometimes also referred to as a request router) is configured to receive request packets from slave memory controller 502. In general, there may be at least two different types of request packets that can be received at decoder 504: (1) read requests and (2) write requests.

In response to receiving a read request, decoder 504 decodes the read request and examines the address information in the decoded read request to determine whether to route the read request to control circuitry 506, to a selected one of HW acceleration unit 508, or directly to some other component within die 100' or to memory 514 (e.g., via bypass path 516). For read requests that require a response, decoder 504 will also track each issued read request to ensure that a corresponding response such as read data is sent back to the master memory controller on the host CPU.

In response to receiving a write request, decoder 504 decodes the write request and examines the address information in the decoded write request to determine whether to route the read request to control circuitry 506, to a selected one of HW acceleration unit 508, or directly to some other component within die 100' or to memory 514 (e.g., via bypass path 516). For writes, decoder 504 will forward the write request and track its progress until completion (i.e., decoder 504 will monitor for write completion). When the write is completed, a corresponding response may or may not be sent back to the master memory controller on the host CPU.

Control circuitry 506 (sometimes referred to as control infrastructure) may be configured to orchestrate how data is processed by the HW acceleration units 508, to monitor errors associated with the programmable device, to service any detected errors, and also to monitor status information (as examples). In particular, control infrastructure 506 may direct the flow and processing of data at both the ingress and egress of the hardware acceleration resources. As already alluded to in FIG. 1, the hardware acceleration units 508 may be programmable soft logic on FPGA 100' each of which can be individually configured to support any desired user function. Exemplary functions that can be implemented by these hardware acceleration resources include custom compression/decompression, encryption/decryption, encoding/decoding, matching functions, other non-standard algorithms, and/or other suitable compute functions that could be applied to the data coming in and/or exiting FPGA device 100'.

Programmable device 100' on accelerator DIMM card 410 may include input-output (I/O) components 510 for interfacing with any type of memory devices 514. Types of external memory interfaces that could be supported using IO block(s) 510 may include: non-volatile memory interfaces such as the 3D XPoint technology developed by INTEL Corporation and other non-volatile DIMM technologies; volatile memory interfaces such as double data rate (DDRx) interfaces, low power DDR (LPDDRx) interfaces, quad data rate (QDR) interfaces, Open NAND Flash Interface (ONFI), and JEDEC's High Bandwidth Memory (HBM) stacked DRAM interface; PCIe-based memory interfaces; Ethernet-based memory interfaces; and/or other suitable interfaces for communicating with external memory. If desired, FGPA 100' may also include internal random-access memory blocks sometimes referred to as embedded static random-access memory (eSRAM) blocks or "bulk" RAM blocks. These bulk RAM blocks may be much larger and denser than the core memory blocks (e.g., RAM blocks 130 in FIG. 1).

Figure 6:
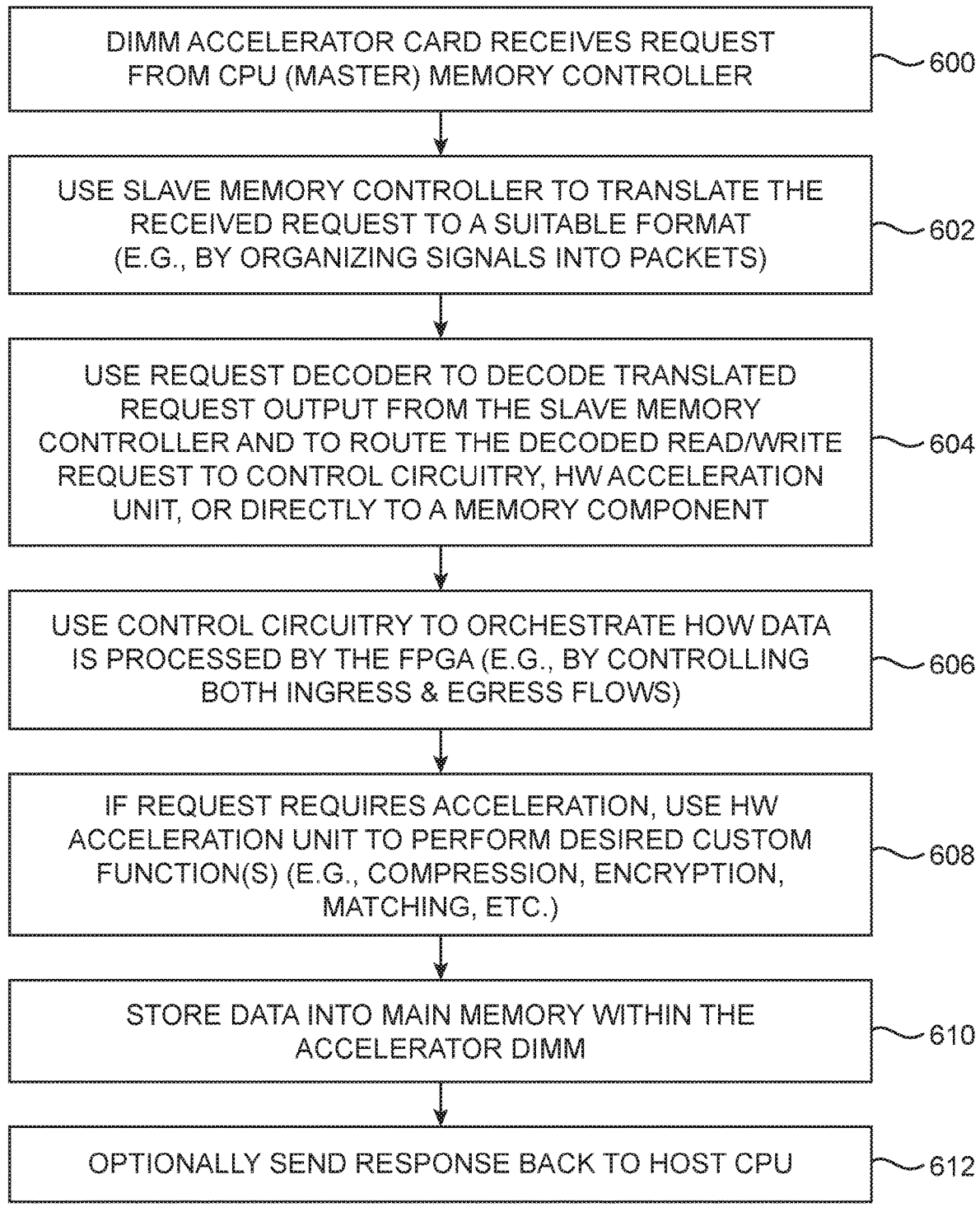
FIG. 6 is a flow chart of illustrative steps for operating the programmable accelerator DIMM card shown in FIGS. 4 and 5 in accordance with an embodiment.

FIG. 6 is a flow chart of illustrative steps for operating programmable accelerator DIMM card 410 of the type shown in FIGS. 4 and 5. At step 600, DIMM accelerator card 410 may receive a request (e.g., a read request or a write request) from the CPU's master memory controller 302.

At step 602, the slave memory controller 502 on DIMM 410 may be used to translate the received request to a suitable format that can be understood by the associated request decoder/router 504. For example, DDR slave controller 502 may organized the received signals into a packet format.

At step 604, request decoder 504 may be used to decode the translated requests received from slave controller 502 and to route the decoded read/write request to control infrastructure 506, to the hardware acceleration resources on FPGA 100' (e.g., to one or more HW acceleration units 508), or directly to external memory 514 or other peripheral component via programmable input-output circuitry 510.

At step 606 (which may optionally occur concurrently with steps 502 and 504), control circuitry 506 may be used to orchestrate how data is being processed within programmable device 100'. For example, control circuitry 506 may direct both ingress and/or egress data flows.

If the issued request requires acceleration, one or more of the hardware acceleration units 508 may be used to perform one or more custom acceleration functions (e.g., compression/decompression, encryption/decryption, encoding/decoding, matching functions, other suitable compute functions, etc.) at step 608.

At step 610, the processed data may then be stored into main memory components such as memory devices 514 within acceleration DIMM 410. Memory devices 514 can be any type of volatile memory (e.g., DDRx memory, LPDDRx memory, embedded SRAM, JEDEC's high-bandwidth DRAM, etc.), non-volatile memory (e.g., INTEL's 3D XPoint memory, flash memory, phase-change memory, resistive random-access memory, etc.), and other suitable types of memory that can be included within accelerator DIMM 410 internal or external to die 100'. At step 612, read data can optionally be sent back to the host CPU.

Figure 7:
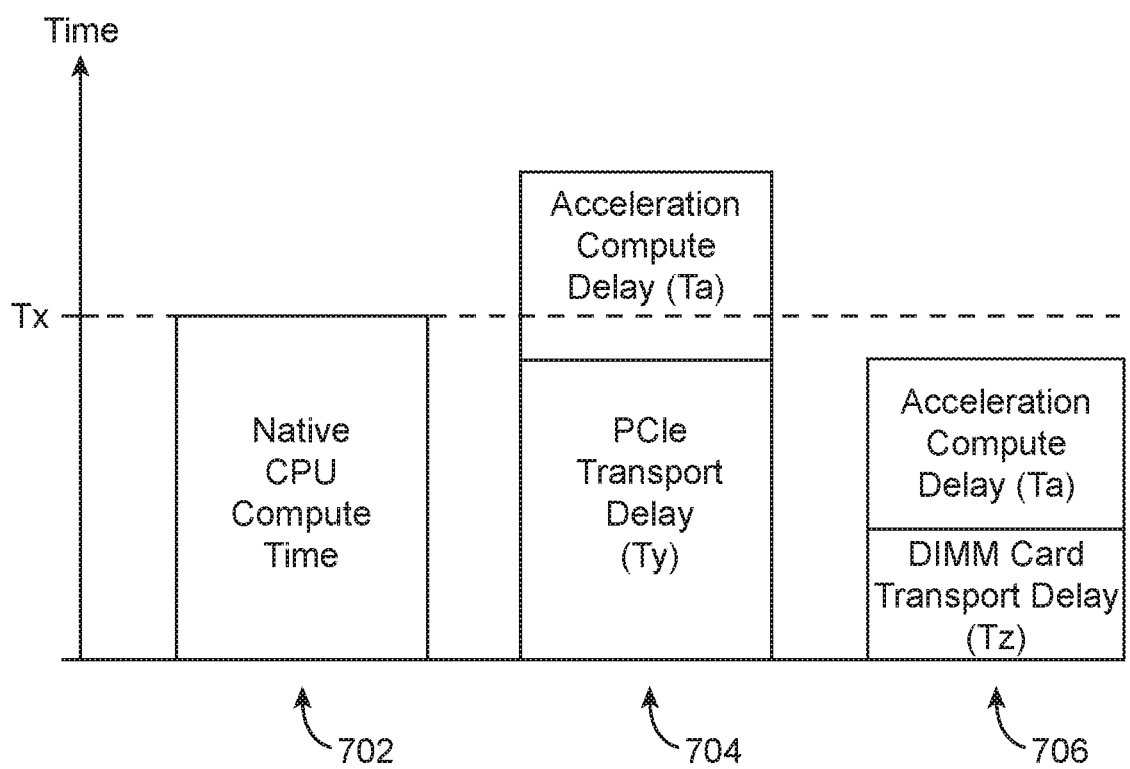
FIG. 7 is a diagram showing the compute time of various tasks that can be performed by the system of FIG. 4 in accordance with an embodiment.

Configured and operated in this way, the inclusion of acceleration circuitry in the DIMM card/slot improves the energy efficiency of applications which have low compute time relative to memory communications latency. FIG. 7 is a diagram showing the compute time of various tasks that can be performed by the system of FIG. 4. For example, consider a scenario in which host CPU 12 needs to compute a task which would take duration Tx when performed natively on the host CPU itself (see portion 702 in FIG. 7).

If host CPU 12 were to offload the task to accelerator FPGA 100 that is connected via high-latency connection 309 (e.g., a PCIe, UPI, or other legacy interface), the total amount of time it would take to complete the task would be equal to the roundtrip transport delay Ty for traversing the high-latency path 309 plus the acceleration compute delay Ta that it takes for the acceleration resources on FPGA 100 to perform the offloaded task. Note that even though the acceleration computer Ta might be less than native CPU compute delay Tx, the combined total time of (Ta+Ty) may exceed Tx when Tx is not much greater or even less than Ty (see portion 704 in FIG. 7).

In such situations, host CPU 12 might instead offload the task to accelerator DIMM card 410 that is connected via low-latency connection 301 (e.g., a main memory interface such as DDRx, LPDDRx, or DDR-T interface). If so, the total amount of time it would take to complete the task would be equal to the roundtrip transport delay Tz for traversing the low-latency path 301 plus the acceleration compute delay Ta that it takes for the acceleration resources on FPGA 100' to perform the offloaded task. Here, since the DIMM card transport delay Tz is substantially less the PCIe transport delay Ty, the combined total time of (Tz+Ty) may actually be less than native CPU compute delay Tx (see portion 706 in FIG. 7). It this case, it would make sense for the host CPU to offload the task to the acceleration DIMM card. As already described above in connection with FIG. 4, Tz is typically at least several orders of magnitude smaller than Ty (e.g., Tz may be at least 10 times, 100 times, 1000 times, 10 thousand times, 100 thousand times, or even millions of times smaller than Ty).

Moreover, adding acceleration resources in the main memory path can provide additional features such as in-line compression and cryptography capability to the system. The use of programmable device 100' in the DIMM card can also help support a wider range of memory technologies that would otherwise not have been natively and directly supported by the host CPU. There is also no need to update the design of the host CPU (i.e., the memory interface implemented on the host CPU can stay constant and independent of whatever memory technology is implemented on the accelerator DIMM card 410).

The use of an acceleration DIMM card may provide technological improvements in many applications. One example is for memory compute applications. For example, consider a scenario in which the host CPU needs to find a minimum value across one million records for a given field of 32 bytes. To perform this task, the host CPU would need to fetch and analyze 32 million bytes of data. With the FPGA acceleration card, the host CPU could send an instruction to the acceleration card sitting in the DDR DIMM socket. The FPGA in the acceleration card could be programmed to perform this data intensive task and would return the final result back to the CPU when complete, which would only be several bytes of data.

Another example is related to database acceleration applications. Consider a delta merge application for a SAP HANA database architecture. When records are being added or deleted, the database needs to maintain a certain change list. The main database will not be updated since there are series of queries that need to be serviced. The database may be stored as two copies (e.g., a golden database and a reference database). The golden database could be used to service incoming requests along with maintaining a delta merge change list. The reference database could be updated with the delta merge change list. Afterwards, the golden database can be change to match the reference database. From this point on, the golden database will service new requests while the reference database will be updated with the change list. Such operations could be offloaded to the acceleration DIMM card and hidden from the host CPU to provide enhanced serviceability.

Another example is related to data analytics acceleration applications. Considering a clustering algorithm such as the K-means clustering algorithm. If host CPU needs to determine which cluster in a plurality of clusters a given data point belongs, the FPGA acceleration DIMM card could be used to run the clustering algorithm and return the resulting cluster to the host CPU.

Another example is related to storage expansion applications. Consider a scenario in which a host CPU with only one DIMM slot can only house X-GB of storage. With a DIMM FPGA acceleration card, multiple instances of X-GB could be housed, which would effectively increase the amount accessible memory for the host CPU (see, e.g., FIG. 5, where accelerator DIMM 410 can include multiple memory devices 514).

Yet another example is related to high-frequency trading applications. FPGA 100' on the DIMM acceleration card include IO components for connecting to Ethernet, PCIe, and other legacy IO ports. In the example of FIG. 4, acceleration DIMM 410 might be directly connected to another accelerator FPGA 100 via connection 450 to completely bypass the CPU. Connection 450 might be a PCIe link (as an example). An Ethernet connection could be used to intake market data and variations in the stock market could be analyzed and stored in memory associated with FPGA 100'. When condition triggers are met, the accelerator DIMM could notify the host CPU that some event has occurred. The direct memory access (DMA) feature where the main memory on DIMM card 450 can be accessed independently from the host CPU can also be supported, which could help properly utilize the extended storage capabilities of the main memory in the acceleration DIMM card while bypassing the entire memory hierarchy and preventing any undesired pollution/trashing.

As already described above, the acceleration DIMM card can be programmed to provide a wide variety of on-demand services. When CPUs are built, certain encryption and compression standards are deployed, which are not optional. With the acceleration FPGA DIMM card, the on-DIMM FGPA 100' can be dynamically reprogrammed or reconfigured to support any type of encryption, compression, encoding, or other non-standard algorithms. In all of these examples, the use of the acceleration DIMM card 410 will reduce power consumption, improve computer performance, and enhance operational efficiency for the entire system. The accelerator FPGA DIMM card 410 can also free up PCIe/UPI ports to connect more CPUs, which can further augment CPU density in datacenters.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is a card, comprising: a programmable integrated circuit having soft logic configured to operate as hardware acceleration resources, wherein the card has a dual in-line memory module (DIMM) form factor, wherein the programmable integrated circuit receives requests from a host central processing unit (CPU), and wherein at least some of the received requests are routed to the hardware acceleration recourses for acceleration; and memory coupled to the programmable integrated circuit.

Example 2 is the card of example 1, wherein programmable integrated circuit is coupled to the host CPU via a main memory interface.

Example 3 is the card of example 2, wherein the main memory interface comprises a double data rate (DDR) interface.

Example 4 is the card of example 3, wherein the main memory interface comprises a Transaction DDR (DDR-T) interface or a non-volatile dual in-line memory module (NVDIMM) interface.

Example 5 is the card of any one of examples 2-5, wherein the host CPU is coupled to another processor via a processor interface, and wherein data transfers through the main memory interface is faster than data transfers through the processor interface.

Example 6 is the card of example 5, wherein the data transfers through the main memory interface is at least one thousand times faster than the data transfers through the processor interface.

Example 7 is the card of any one of examples 1-6, wherein the memory comprises at least one of non-volatile memory and volatile memory.

Example 8 is the card of any one of examples 1-7, wherein the programmable integrated circuit further comprises: a memory controller configured to translate the requests received from the host CPU; and a request decoder configured to decode the translated requests and to route the decoded requests to a suitable destination within the card.

Example 9 is the card of example 8, wherein the programmable integrated circuit further comprises control circuitry configured to orchestrate the flow of data into and out of the programmable integrated circuit.

Example 10 is the card of example 9, wherein the programmable integrated circuit further comprises input-output components configured to interface with different types of peripheral devices formed on the card or external to the card.

Example 11 is a method of operating a computer card, comprising: with the computer card, receiving a request from a host central processing unit (CPU), wherein the computer card has a dual in-line memory module (DIMM) form factor; using hardware acceleration resources in the computer card to process at least some of the received requests and to generate corresponding processed data; and storing the processed data into memory in the computer card.

Example 12 is the method of example 11, further comprising translating the received requests into packets using a memory controller on the computer card.

Example 13 is the method of example 12, further comprising: with a decoder on the computer card, decoding the translated requests received from the memory controller and routing the decoded requests to a suitable location in the computer card.

Example 14 is the method of any one of examples 11-13, wherein using the hardware acceleration resources in the computer card to process at least some of the received requests comprises using the hardware acceleration resources to perform a custom function selected from the group consisting of: compression/decompression, encryption/decryption, encoding/decoding, and matching.

Example 15 is the method of any one of examples 12-13, further comprising: with the memory controller on the computer card, sending a response back to the host CPU.

Example 16 is a system comprising: a host processor that includes a master memory controller; and an acceleration dual in-line memory module (DIMM) card connected to the host processor via a main memory interface, wherein the acceleration DIMM card includes a slave memory controller for communicating with the master memory controller of the host processor, wherein the host processor is operable to offload a task onto the acceleration DIMM card to free up compute power on the host processor, and wherein the acceleration DIMM card includes memory for storing data associated with the offloaded task.

Example 17 is the system of example 16, further comprising a coprocessor connected to the host processor via an additional interface having a first latency, wherein the main memory interface exhibits a second latency that is at least ten times less than the first latency.

Example 18 is the system of example 17, wherein the acceleration DIMM card is directly connected to the coprocessor via a bypass path.

Example 19 is the system of any one of examples 16-18, wherein the main memory interface comprises a double data rate (DDR) based interface.

Example 20 is the system of example 19, wherein the memory on the acceleration DIMM card comprises non-volatile memory.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A card, comprising:
   a programmable integrated circuit having soft logic configured to operate as hardware acceleration resources, wherein the card has a dual in-line memory module (DIMM) form factor, wherein the programmable integrated circuit receives requests from a host central processing unit (CPU), wherein at least a first portion of the received requests are routed to the hardware acceleration resources for acceleration, and wherein the programmable integrated circuit is coupled to the host CPU via a transaction double data rate (DDR-T) main memory interface to facilitate implementation of the hardware acceleration resources on the programmable integrated circuit; and
   memory coupled to the programmable integrated circuit, wherein a second portion of the received requests are routed to the memory without passing through the hardware acceleration resources.

2. The card of claim 1, wherein the host CPU is coupled to another processor via a processor interface, wherein a data transfer through the DDR-T main memory interface is faster than a data transfer through the processor interface, and wherein the another processor comprises a programmable accelerator device.

3. The card of claim 2, wherein the data transfer through the DDR-T main memory interface is at least one thousand times faster than the data transfer through the processor interface.

4. The card of claim 1, wherein the memory comprises at least one of non-volatile memory and volatile memory.

5. The card of claim 1, wherein the programmable integrated circuit further comprises:
a memory controller configured to translate the requests received from the host CPU; and
a request decoder configured to decode the translated requests and to route the decoded requests to a suitable destination within the card.

6. The card of claim 5, wherein the programmable integrated circuit further comprises:
control circuitry configured to orchestrate the flow of data into and out of the programmable integrated circuit.

7. The card of claim 6, wherein the programmable integrated circuit further comprises:
input-output components configured to interface with different types of peripheral devices formed on the card or external to the card.

8. A method of operating a computer card, comprising:
with the computer card, receiving a request from a host central processing unit (CPU), wherein the computer card has a dual in-line memory module (DIMM) form factor;
using hardware acceleration resources in the computer card to process at least some of the received requests and to generate corresponding processed data;
storing the processed data into memory in the computer card; and
with the computer card, communicating with a programmable soft logic circuit by bypassing the host CPU, wherein the programmable soft logic circuit is separate from the computer card and the host CPU.

9. The method of claim 8, further comprising:
with a memory controller on the computer card, translating the received requests into packets; and
with a decoder on the computer card, decoding the translated requests received from the memory controller and routing the decoded requests to a suitable location in the computer card.

10. The method of claim 8, wherein using the hardware acceleration resources in the computer card to process at least some of the received requests comprises using the hardware acceleration resources to perform a custom function selected from the group consisting of: compression/decompression, encryption/decryption, encoding/decoding, and matching.

11. The method of claim 8, further comprising:
with the memory controller on the computer card, sending a response back to the host CPU.

12. A system, comprising:
a host processor that includes a master memory controller;
an acceleration dual in-line memory module (DIMM) card connected to the host processor via a main memory interface, wherein the acceleration DIMM card includes a slave memory controller for communicating with the master memory controller of the host processor, wherein the host processor is operable to offload a task onto the acceleration DIMM card to free up compute power on the host processor, and wherein the acceleration DIMM card includes memory for storing data associated with the offloaded task; and
a programmable coprocessor having soft logic, wherein the programmable coprocessor is separate from the acceleration DIMM card and is connected to the host processor via an additional interface having a first latency, wherein the main memory interface exhibits a second latency that is at least ten times less than the first latency, and wherein the programmable coprocessor comprises acceleration resources for the host processor.

13. The system of claim 12, wherein the acceleration DIMM card is directly connected to the coprocessor via a bypass path.

14. The system of claim 12, wherein the main memory interface comprises a transaction double data rate (DDR-T) interface.

15. The system of claim 14, wherein the memory on the acceleration DIMM card comprises non-volatile memory.

* * * * *